2,770,616

FRACTIONATION OF PROTEINACEOUS MATERIALS IN BLOOD PLASMA AND LIVER TISSUE

Edwin J. Cohn, Cambridge, Mass.; Rebekah R. Cohn, Charles A. Coolidge, and Eustace Seligman, executors of said Edwin J. Cohn, deceased, assignors to Protein Foundation, Incorporated, Cambridge, Mass., a non-profit corporation No Drawing. Application January 29, 1951, Serial No. 212,204

5 Claims. (Cl. 260—112)

This invention relates to the fractionation of proteins and has for its object improved methods for the recovery of individual proteins and protein groups from proteinaceous containing material, such as animal blood plasma and animal and vegetable fluids and/or tissues.

In my Patents No. 2,390,074 (issued as a continuation-in-part of my United States Serial No. 371,401, filed December 23, 1940) and No. 2,469,193, and elsewhere in the literature (Chemical Reviews, volume 28, No. 2, April 1941; Journal of the American Chemical Society, volume 69, p. 459, 1946), I have described methods for fractionating proteins from ethanol-water mixtures under a five variable system involving control of the variables: temperature, pH, ionic strength, concentration of precipitant and concentration of the protein components.

These methods have tremendous advantages over prior known commercial salting-out methods and permitted large-scale commercial recovery of protein components of human blood plasma in physico-chemical states closely approximating those found in blood circulating in the human body.

In specific extractions and precipitations described in said patents and in commercial processes adopted thereunder, wide variations in the percent of protein precipitant and in pH were relied upon, as taught in said patents, in order to carry the conditions successively either acidic or basic to the isoelectric point of the various constituents at the given concentration of precipitant. Thus, the concentration of alcohol was carried up to 40% by volume and the pH from at least as high as neutral down to pH 4.7, where the solubility of serum albumin is minimal, near its isoelectric point.

The ionic strengths, due to the electrolyte concentration in the plasma or other proteinaceous material being treated, were from 2 to 10 in the earlier art where proteins were separated from each other by salting out in ammonium sulfate solutions (Bull. N. Y., Academy of Medicine, October 1939, 2nd series, vol. XV, #10, page 654) and were relatively high even in my earlier method of fractional precipitation in alcohol-water mixtures ranging from 0.16, the ionic strength of plasma, to .04 in initial precipitations at four times the volume of plasma. The electrolyte in the original tissue rendered it difficult to achieve lower ionic strengths by fractional precipitation from any tissue or body fluid without unduly increasing the volume of the system. It was necessary to rely on ethanol concentration and pH within the attainable ionic strength range to bring about precipitation of certain components.

Methods of this invention have for one object, the fractionation of proteins by systems involving less variation in pH, and, in particular, avoidance of the acid pH range which tends to alter certain proteins and protein complexes, such as those between protein and protein or between protein and smaller organic molecules such as co-enzymes and vitamins found in liver, such as the active principle, effective in the treatment of pernicious anemia.

One example of the latter, is described in my co-pending application Serial No. 84,731, filed March 31, 1949, now abandoned in favor of its continuation-in-part application Serial No. 257,158, filed November 19, 1951, now abandoned.

Although certain operations may sometimes be carried out over wider pH ranges in the interest of convenience or yield, protein separations of this invention can, for example in the case of blood plasma, be accomplished in the range of pH 6.8 to 7.4, that is, not very different from the pH of blood in the body or in the blood bank, thus more nearly maintaining the conditions in which the proteins occur in nature and making it possible to determine their state in nature.

Moreover, one of the advantageous features of this invention is that the time necessary to approximate equilibrium is greatly reduced, thus making continuous processing in completely automatic equipment more readily achievable.

A further object of this invention is the elimination in many cases and a reduction in all cases of the concentration of organic protein precipitant that is necessary, which again is advantageous in minimizing denaturation of the proteins or affect on protein complexes. In fact, in accordance with the method of this invention, separations of proteins can be accomplished without addition of an organic precipitant.

A further object of the invention is to carry out the separations from the solid state. Maintaining the unseparated proteins in the solid state tends to minimize the action of enzymes upon substances which are their substrate. Accordingly, after the initial precipitation of the plasma proteins, subsequent separations are carried out by fractional extraction or by alternation of fractional extraction and precipitation in such a way as to take advantage of optimum separation, the time in solution being maintained as short as convenient. Moreover, with fractional extraction, it is possible to achieve the low ionic strengths which are often most successful in procuring separations by the methods of this invention.

Obviously, separations in limited ranges of pH, and at low concentrations of precipitant, cannot be accomplished without resort to other mechanisms or techniques which will render proteins, usually soluble or insoluble under the given conditions of pH, ionic strength and concentration of precipitant, if present, insoluble or soluble, as the case may be, in order to effect their separation from other proteins which are not affected to the extent of materially changing their solubility on the application of such mechanisms or techniques.

According to this invention, use has been made of protein salt or other complex formation with cations and anions of inorganic or organic nature, the interactions of which with proteins do not, like the interactions of most proteins with sodium ions, depend merely upon valence and the mean effective diameters of the ions and protein molecules. Such simple interactions of the sodium ion type permitted utilization in the old methods of the general salting-in rule of increasing solubility with increasing ionic strength, especially at low ionic strengths; and separations were made in reliance upon differences in the isoelectric points and the electric moments of the various proteins, differences which rendered the solubilities sufficiently different in various solutions of a given pH and ionic strength, to permit effective protein separations to be made in ethanol-water mixtures.

The principle here utilized is that of specific ion-protein interactions forming new saturating bodies. Contrary to the principle heretofore stated that solubility increases with the square of the valence of the ion regardless of the nature of the ion, a great deviation from this principle is manifested in the presence of certain ions, positive or negative. This deviation may be taken as an indication of the formation of a new complex, which at the appropriate pH, yields a new phase. The possibility of selective conditions under which the salts of selected proteins exist as new phases affords even a greater number of degrees of freedom of the system and, therefore, results in more effective and quantitative separations.

As a result, proteins may be separated from each other by utilizing the conditions under which protein complexes with inorganic or organic ions increase the number of phases in the system. This additional tool, added to those previously disclosed in my prior patents, renders it possible to effect separations more quantitatively and more rapidly under more satisfactory conditions for separations, with more assurance that the proteins will remain undenatured and more nearly in the state that exists in nature. In short, it renders possible effective separations between essentially all body fluid and tissue proteins.

The recoveries hereof are, therefore, by no means limited to those obtainable as the result of differing solubilities caused by electric moments and ionic strength. The separations and quantitative recoveries in accordance with this invention utilize instead of, or in addition to, such recoveries, recoveries attained by means of differing solubilities resulting from specific interactions.

Moreover, the decrease in solubility attained by some of the specific ion-protein interactions hereof, permit in some cases, quantitative separations of proteins in a purely aqueous system. The added cation or anion may be present in not much more than stoichiometric proportion to the protein precipitated, and, as will be further described, in the case of bivalent metal cations such as zinc, cadmium, calcium and barium, the concentration of the ion may be in the range of only about 1 to about 10 or 20 equivalents per mole protein.

Thus, many of the proteins of plasma form salts with certain inorganic ions, which salts are insoluble in water, and even more insoluble in alcohol water mixtures, in which the sodium salts of the same proteins are soluble. It is difficult to achieve a low ionic strength in plasma without dialysis. Even a five-fold increase of the volume decreases the ionic strength to only 0.04. Under these circumstances, at pH 5.8 near 0° C., only fibrinogen and a few other proteins or protein complexes of low solubility in water near this pH at this ionic strength will precipitate. If, however, the ethanol concentration at this pH is increased to 0.066 mole fraction at —5° C., a great many other proteins will precipitate as the sodium salts. Indeed, about 37% of the plasma proteins will be precipitated including certain of them such as the gamma globulins which are insoluble under these conditions only because of protein-protein interactions as hereinafter described.

If the plasma is collected over an exchange resin to remove calcium, most of the unstable proteins may be precipitated even at neutral pH without any addition of alcohol or other diluent at 0° C., by the addition of as little as 10 millimoles of zinc, as in the form of zinc acetate, per liter of plasma. Proteins so precipitated from the plasma include the gamma globulins, fibrinogen, plasminogen, anti-hemophilic globulin and the accelerator globulin of Seegers and the labile factor of Quick, together with $\beta$ lipoproteins and other euglobulins of large molecular size and certain of the enzymes. This precipitate may be removed by centrifugation. Zinc is then removed from the solution by passing it over a cation exchange resin, the zinc being replaced by sodium.

If the plasma contains citrate or other metal-combining component added as an anticoagulant, the same procedure may be followed after the removal of citrate by an anion exchange resin or the quantity of zinc added must be greater so there is a sufficient excess of zinc available over that bound to the citrate or other metal-combining component.

When the advantages of using zinc in the precipitation of proteins became apparent, and it was desirable to make separations, the first approach which yielded successful results was to work with smaller amounts of the metal than were necessary to saturate the complex forming groups of the proteins to be precipitated. The reproduceability of this procedure was less satisfactory than that now to be described, because the order and rate of addition of the zinc and change in pH could bring about different results just as could the order of addition in protein-protein interactions. Also, where the affinity constants were closely alike, equilibrium was reached but slowly. The use of high ionic strengths did not solve this problem as satisfactorily as the use of slightly more than the stoichiometric amount zinc, for example, the 10 mM. of zinc used in the precipitation of the water-insoluble proteins of human plasma at pH 6.8.

The supernatant remaining after the removal of the precipitate contains $\alpha_1$ lipoproteins, $\alpha_2$ glycoproteins and the $\beta_1$ metal-combining protein in addition to the albumins of the plasma. The albumins account for between 52 and 55% of the plasma proteins, while the total supernatant protein content may be from 65–73% of the total plasma proteins in about a 5.5% solution. Although this solution is electrophoretically heterogeneous, its proteins sediment in the ultracentrifuge with substantially the same velocity as the albumins of plasma.

The components of the supernatant are for the most part the same substances that remain in solution at 0.066 mole fraction ethanol at —5° C., pH 5.8. However, the economy of operation at neutral pH rather than at pH 5.8, at temperatures not below 0° C., without any dilution to reduce ionic strength or the necessary introduction of ethanol, is of vital importance in the simplification of blood processing. Since the present system utilizing zinc is essentially isohydrionic, there being no appreciable change in pH, the slower equilibrations involved in large changes in acid-base equilibria are avoided.

The present methods, therefore, should rapidly replace the techniques now commercially used in plasma fractionation for the Red Cross.

Moreover albumin used in shock treatment has been heated for 10 hours at 60° C. to render it safe against virus transmission. The present solution which has been termed "Stable Plasma Protein Solution" (S. P. P. S.) can be heated for this length of time at a higher temperature or a longer time at 60° C. Moreover, its temperature of coagulation exceeds 74° C. after the zinc has been removed to a concentration of less than $5 \times 10^{-5}$ molar. Because S. P. P. S. can be made more stable than albumin, the indication is that the stability of albumin as heretofore prepared was, to some degree at least, impaired by the alcohol separation technique. In both cases, a stabilizing agent such as a sodium salt of a non-polar anion, for example, sodium caprylate or sodium acetyl tryptophanate, is added, e.g. 0.004 molar sodium caprylate.

In particular, the stability of S. P. P. S. is improved where an effort is made to remove or destroy that part of the lipoproteins which remain soluble in water at 0° C. and neutral pH in the presence of 10 millimoles of zinc per liter of plasma. That part may be removed by adsorption on barium sulphate, by other reagents or conditions such as adsorption on calcium carbonate, either before or following the aqueous zinc precipitation.

S. P. P. S. also contains certain enzymes, notably alkaline phosphatase and esterase and some of the amylase. Amylase can be removed by adsorption on starch; phosphatase and esterase by subfractionation of the solution, although the latter do not appear to seriously interfere with the stability of S. P. P. S., very likely because their substrates are not present.

S. P. P. S. is thus a special product prepared (a) by separating out either by specific adsorptions, or (b) in the fractionation itself in the presence of the metal insolubilizing agent (1) as many as possible of the labile components and (2) as many as possible of the enzymes for which one or more of the still soluble substances is the substrate. It may be dispensed in solution for intravenous injection into humans. It may be freed of the danger of virus transmission by protracted storage or, if used earlier, by heating at 60° C. If desired, the proteins in S. P. P. S. may be precipitated as zinc complexes in 0.066 mole fraction alcohol near pH 6.8 at —5° C. except for a few of the smaller proteins which can be carried down by raising the pH to between 7.5 and 8.

These same precipitations may, of course, take place after an initial separation in 0.066 mole fraction alcohol, by the addition of zinc after removal of the initial precipitate.

It has been demonstrated that various proteins, particularly those contained in blood plasma, have differing affinities for metals. Thus, a portion of the albumin called mercaptalbumin combines with mercury through a sulfhydryl group. The solubility of this mercury dimer is lower than that of the monomer. Zinc combines with the carboxyl group of some proteins to form complexes. Zinc also combines with amino acids such as glycine to form complexes. Just as cysteine can be used to remove mercury from plasma, so glycine or other amino acids or related compounds that combine with zinc may be used to remove the zinc from certain proteins. Since the affinity of zinc or other metals for each different protein differs, it is possible, by the addition of glycine, to take the zinc, or other metal cation acting in the same way, away from certain proteins preferentially, thus rendering those proteins which have been deprived of the metal by the glycine more soluble and permit their separation from other proteins whose affinity for the metal is greater than that of the glycine and which, therefore, remain insoluble under the specified conditions. Because of the differing affinity of metals such as zinc for glycine and for some of the proteins, they may be considered as metal buffers as may the metal proteinates.

Glycine is not the only amino acid or related molecule which combines with metals. All alpha amino acids bind bivalent cations with varying affinity. For example, proline has a greater affinity than glycine, while asparagine, serine and methiamine have less affinity. Peptides such as diglycine may act as metal buffers, as also such related substances as glycolamide, lactamide and the amides of dicarboxylic acids such as glutamide. By using a graded series of zinc buffers of this kind, or by using another metal with different affinities between the metal and buffer, much closer distinction between the proteins can be conveniently made than in the absence of such metal buffers. As a result, separations between proteins can be made which were not previously possible.

The use of these buffers which could even be proteins with different affinity constants permits fine distinctions to be made depending only upon the affinity constant of a relatively small number of groups of the proteins forming the relatively undissociated insoluble complexes.

Subfractionation of the proteins initially precipitated by 10 millimoles of zinc per liter plasma may thus be accomplished as follows: The gamma globulins, as the other components of this system, remain completely insoluble at pH 7 in water at 0° in the presence of 10 millimoles per liter plasma of zinc. If the zinc proteins were triturated with large volumes of water, zinc would dissociate from some of the precipitated proteins. The inclusion of 5 or even somewhat less millimoles of zinc in a washing solution is more than enough, however, to prevent loss of zinc from the protein in the precipitate. If, in addition to the 5 millimoles of zinc, glycine be included in adequate amounts, the gamma globulins are extracted from the mass. The mere addition of slightly more than 2 equivalents which would form zinc diglycinate does not withdraw sufficient zinc to extract any appreciable amount of gamma globulins. Even four times as much glycine as zinc, that is, 20 millimoles of glycine per 5 millimoles of zinc has no appreciable effect on the solubility of the gamma globulins. 10–20 millimoles serve as an admirable initial wash, since albumin and other soluble proteins that were occluded are extracted. If, however, after the initial wash, thirty times as much glycine as zinc is present, that is, 150 millimoles per liter, solubility of the gamma globulins is greatly increased, as shown by their extraction; and if the ionic strength is sufficiently low, the $\beta$ lipoproteins, fibrinogen and certain other components remain insoluble.

This phenomenon may be understood in terms of the mass law. Only when the affinity constants of the chemical groups of the protein and of the metal buffer are of a different order of magnitude, can the mass law, as a first approximation, be ignored. The affinity constants of glycine for zinc are greater than those of some but not all of the plasma proteins. Thus, the metal buffer, glycine, has so much greater affinity for zinc than albumin that the mere addition of three or four equivalents of glycine dissolves albumin.

With fibrinogen and lipoprotein, however, the affinity constants of at least certain of the groups bonded to zinc are so much higher than that of glycine that even higher concentrations of glycine, a higher ionic strength or a stronger metal buffer must be employed. Citrate may be considered as a very strong metal buffer. If a stoichiometric amount of citrate is added, it is as effective as 10 times the amount of glycine for solubilizing gamma globulins.

Historically, citrate has generally been used as an anticoagulant to combine with calcium in blood collection. The present methods, therefore, could have been, but quite naturally were not, developed before exchange resins or other methods supplanted the use of citrate in blood collection. Where citrate is still used as an anticoagulant, it is necessary, prior to application of the initial fractionation method of this invention, to overcome the sequestering capacity of the citrate by addition of an equivalent amount of cation such as magnesium or zinc. Another method would be the removal of the citrate by passage over an anion exchange resin.

Use of glycine in connection with metal proteinates such as zinc proteinate, depends upon the very small amount of dissociation of the zinc glycinate as well as of the zinc proteinate. It is the affinity constants of the glycine and the protein that determine the distribution of the zinc between them.

In addition to utilizing metal-protein complexes as a tool for attaining fine separations between proteins at nearly neutral pH, it is also possible to take advantage of specific interactions that occur between proteins resulting in the formation of salt-like complexes for creating sufficient change in solubility, in water with or without an organic precipitant, as to permit more ready separation of protein constituents of the mixture. These protein-protein complexes are often dependent upon opposite net charges in the proteins. The creation or maintenance of the specific interaction may, therefore, be procured by bringing or maintaining the pH of the protein mixture between the isoelectric points of the interacting proteins.

Such interactions may be dissociated by reverting the pH to a point where the two interacting proteins both have the same sign of net charge, that is, to a point where the pH is either acid or alkaline to both isoelectric points of the two interacting proteins.

Where, however, such change in pH is undesirable, the complexes may often be dissociated by increasing the dielectric constant of the medium by the addition of dipolar ions such as glycine, $\beta$-alanine, or, in some instances, by mere increase in ionic strength.

An example of such a protein-protein interaction is presented in the case of blood plasma which contains a normal mixture of albumin, gamma globulins and $\beta$-lipoproteins.

The human serum albumins have minimum solubilities near pH 4.7, slightly acid to their isoelectric points. In one of the procedures described in my previous patents, serum albumins were extracted from the globulins at pH 5.8 in 40% ethanol at 0.05 ionic strength and were precipitated by adjusting the pH to 4.7.

I have now found that the concentration of alcohol may be reduced to a point where the gamma globulins would normally be soluble, if present as salts of such anions as chloride or acetate. However, by reason of the presence of other protein components of the plasma, and in particular, the $\beta$-lipoproteins which are far less soluble than the gamma globulins, the gamma globulins remain unextracted under conditions of great albumin solubility. By maintaining the pH at approximately 5.8, the positive charge of the soluble gamma globulins with isoelectric points between 6.3 and 7.3 permits formation of complexes between the gamma globulins and the insoluble $\beta$-lipoproteins which bear a negative charge at reactions alkaline to their isoelectric points, near 5.4. These complexes are insoluble in 20% ethanol. I thus can take advantage of the $\beta$-lipoproteins to effect a separation between gamma globulins and albumins, both of which would be soluble in 20% enthanol at a pH of 5.8.

If the pH were acid to the isoelectric point of the $\beta$-lipoproteins, let us say at pH 5.2, this protein and the gamma globulins would bear the same sign of charge (positive). At this pH, the gamma globulins would be even more soluble than at 5.8, being further from their isoelectric points. However, they would still remain insoluble in 20% ethanol at —5° C. now forming complexes with the serum albumins which have still more acid isoelectric points and are negatively charged at this pH. Moreover, formation of these complexes not only holds gamma globulins in the solid state but also the amount of albumin that has entered into this complex formation and which, therefore, no longer remains quantitatively in solution as at pH 5.8.

Another example of a metal ion which acts much in the manner of zinc is cadmium.

Among the components of plasma of high solubility and lower isoelectric points than albumin is the recently crystallized acid glycoprotein. The zinc salts of this substance are readily soluble even in 35% ethanol at —8° C. The barium salt, however, has only ½, and the cadmium salt has only 1/100 the solubility of the zinc salt. The great effect of the ionic strength on the solubility of the glycoprotein metal proteinates is noteworthy.

It is of interest that this very acid glycoprotein should be less soluble as the cadmium than as the zinc salt. It is precisely the reverse of the influence of these metals upon alkaline phosphatase which is normally precipitated with zinc. The separation of alkaline phosphatase from most other zinc salts can be achieved by precipitating most of them as cadmium salts but not the phosphatase and then precipitating phosphatase as the zinc salt.

The ion protein interaction has also been taken advantage of in the fractionation of tissues such as animal liver tissues. Application of the blood plasma extraction step at pH 5.8, ionic strength at 0.15 at —8° C. in 0.066 mole ratio ethanol when applied to fresh or frozen but properly perfused and comminuted liver has resulted in the extraction of blood proteins from the liver, including albumin and hemoglobin, thus separating these proteins in a single step from the very large number of liver enzymes, which are extracted in an aqueous system. Thus, the removed extract is stabilized and enzymatic activity in the residue minimized.

The extracted albumin and hemoglobin can be readily precipitated from the extract without substantial change in pH or temperature by the mere addition of zinc ions, as in the case of the alcohol precipitation of albumin and zinc albuminates in blood plasma fractionation.

Thus, frozen bovine liver perfused with cold isotonic salt solution containing citrate and phosphate as enzyme inhibitors was finely comminuted and then suspended in an ethanol water solution at 0.066 mole fraction ethanol concentration at pH 5.8 and ionic strength 0.04 at —8° C., the solution being five times the volume of the fresh unperfused liver. After three hours, the suspension was centrifuged at —8° C.

The solution obtained was then clarified by filtration at —8° C. after which sufficient 1 M. zinc acetate solution was added to give final zinc concentration of 0.02 M. and a pH of 5.9–6.0. The zinc solution was added slowly with stirring. After 3 hours, the suspension was centrifuged and the resulting paste of zinc proteinates resuspended in 10 volumes of citrate, acetate, phosphate buffer of ionic strength 0.015 and passed through an exchange resin until clear to remove the zinc. The solution was then dried from the frozen state and comprised when dry 12% by weight of the fresh liver including albumin and hemoglobin.

The residue at the low temperature remained in condition for further alcohol-water extraction, at less alcohol concentration, of certain enzymes including the alkaline and acid phosphatases, liver esterase, cathepsin to Hb and anthine oxidase. This second extraction was then followed by aqueous extraction of non-protein molecules combined to specific proteins including the active principle effective in the treatment of pernicious anemia, at pH 5.8, ionic strength 0.15 at 0° C. in accordance with the principle set forth in my copending application Serial No. 84,731, filed March 31, 1949.

I claim:

1. A method for the quantitative separation of albumin from the fibrinogen and gamma globulin content of blood plasma comprising equilibrating the plasma at a temperature near the freezing point of the plasma at a pH of 6.8 to 7.4 and an ionic strength of approximately 0.15, in the presence of a sufficient quantity of zinc ions to precipitate the fibrinogen and gamma globulin content of the plasma in the form of insoluble zinc complexes while retaining the solubility of the albumins and thereafter separating the soluble albumins from the insolubilized fibrinogen and gamma globulin zinc complexes.

2. A method for the quantitative separation of gamma globulin from blood plasma comprising equilibrating the plasma at a temperature near the freezing point of the plasma at a pH of 6.8 to 7.4 and an ionic strength of approximately 0.15, in the presence of a sufficient quantity of zinc ions to precipitate the fibrinogen and gamma globulin content of the plasma in the form of insoluble zinc complexes while retaining the solubility of the albumins, separating the soluble albumins from the insolubilized fibrinogen and gamma globulin zinc complexes, resuspending the fibrinogen and gamma globulin zinc complexes in a solution containing glycine for removing the zinc preferentially from the insoluble zinc-gamma globulin complexes and render the gamma globulin soluble while retaining the insolubility of the fibrinogen-zinc complexes and then separating the soluble gamma globulin from the insoluble fibrinogen-zinc complexes.

3. A method for the quantitative separation of albumin from other proteins of albumin-containing animal body fluids and tissue materials comprising treating the material with an approximately 0.066 mole fraction ethanol-water solution at a pH of about 5.8 and an ionic strength of approximately 0.04, separating the soluble albuminates from the insolubles and then adding zinc ions to the soluble albuminate-containing solution to precipitate insoluble zinc albuminates and then treating the precipitate to remove the zinc.

4. The method for the quantitative separation of albumin from animal liver comprising suspending the liver in approximately 0.066 mole fraction ethanol water solution at a temperature near the freezing point of the solution at a pH of about 5.8 and ionic strength of approximately .04, separating the soluble albuminates from the insolubles and then adding zinc ions to the soluble albuminate-containing solution to precipitate insoluble zinc albuminates and then treating the precipitate to remove the zinc.

5. A method for the quantitative separation of albumin from other proteins of albumin-containing animal body fluids and tissue materials comprising equilibrating the material in water solution at a temperature near the freezing point of the solution at a pH of about 6.8 and an ionic strength of approximately 0.15, separating the soluble albuminates from the insolubles and then adding to the soluble albuminate-containing solution zinc ions to precipitate insoluble zinc albuminates and then treating the precipitate to remove the zinc.

References Cited in the file of this patent

UNITED STATES PATENTS

| | | |
|---|---|---|
| 966,196 | Goodman | Aug. 2, 1910 |
| 2,433,905 | Hughes | Jan. 6, 1948 |
| 2,469,193 | Cohn | May 3, 1949 |

OTHER REFERENCES

Cohn et al.: JACS, vol. 72, pp. 465–74 (1950).